(12) United States Patent
Tan et al.

(10) Patent No.: US 10,951,753 B2
(45) Date of Patent: Mar. 16, 2021

(54) MULTIPLE TALKGROUP NAVIGATION MANAGEMENT (71) Applicant: MOTOROLA SOLUTIONS, INC., Chicago, IL (US)

(72) Inventors: Choon Cheng Tan, Penang (MY); Yen Hsiang Chew, Penang (MY); Tejeash Duraimanickam, Kedah (MY); Guo Dong Gan, Kuala Lumpur (MY); Mohamed Ashraf Ali Jahaber Ali, Penang (MY); Jin Hoe Phua, Perak (MY); Desmond Santhanasamy, Penang (MY); Swee Yee Soo, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/232,274

(22) Filed: Dec. 26, 2018

(65) Prior Publication Data
US 2020/0213442 A1    Jul. 2, 2020

(51) Int. Cl.
*H04M 1/725* (2006.01)
*H04W 76/45* (2018.01)
*H04W 4/10* (2009.01)
*H04W 4/08* (2009.01)

(52) U.S. Cl.
CPC ......... *H04M 1/72583* (2013.01); *H04W 4/08* (2013.01); *H04W 4/10* (2013.01); *H04W 76/45* (2018.02)

(58) Field of Classification Search
CPC ......... H04W 4/08; H04W 4/10; H04W 76/48; H04M 1/72583
See application file for complete search history.

(56) References Cited

U.S. PATENT DOCUMENTS

| 6,847,387 | B2 | 1/2005 | Roth |
| 8,225,407 | B1 | 7/2012 | Thrower et al. |
| 8,972,878 | B2 | 3/2015 | Mohler et al. |
| 9,336,675 | B2 | 5/2016 | Miller et al. |
| 9,584,987 | B1* | 2/2017 | Bar-On ................... H04W 4/10 |
| 10,129,711 | B1 | 11/2018 | Saadoun et al. |

(Continued)

FOREIGN PATENT DOCUMENTS

WO    2017201065 A1    11/2017

OTHER PUBLICATIONS

International Search Report and Written Opinion dated Feb. 28, 2020 for related International Application No. PCT/US2019/065272 (14 pages).

*Primary Examiner* — Wen W Huang
(74) *Attorney, Agent, or Firm* — Michael Best and Friedrich LLP (57) ABSTRACT

A method and device for navigating between multiple talkgroups. The device includes a user input interface, a display, and an electronic processor communicatively coupled to the display. The processor is configured to generate, on the display, a graphical user interface, associate the communication device with a first talkgroup, present, on the display, a first application related to the first talkgroup, receive, via the user input interface, a user input indicative of a request to change talkgroups, associate, in response to the user input, the communication device with a second talkgroup, and present, on the display, a second application related to the second talkgroup.

20 Claims, 6 Drawing Sheets

(56) References Cited

U.S. PATENT DOCUMENTS

| | | | |
|---|---|---|---|
| 10,455,373 B2* | 10/2019 | Tillet | H04W 4/10 |
| 10,499,202 B1* | 12/2019 | Koh | H04W 4/70 |
| 2006/0276200 A1* | 12/2006 | Radhakrishnan | H04L 63/302 |
| | | | 455/456.1 |
| 2009/0284348 A1* | 11/2009 | Pfeffer | G08B 25/006 |
| | | | 340/7.3 |
| 2010/0070758 A1* | 3/2010 | Low | H04W 4/08 |
| | | | 713/155 |
| 2012/0144305 A1 | 6/2012 | Bekiares et al. | |
| 2014/0257897 A1* | 9/2014 | Fernandez, Jr. | |
| | | | G06Q 10/06311 |
| | | | 705/7.15 |
| 2014/0278046 A1* | 9/2014 | Saylors | H04W 4/023 |
| | | | 701/300 |
| 2015/0186610 A1 | 7/2015 | Sansale et al. | |
| 2015/0332424 A1* | 11/2015 | Kane | H04W 4/08 |
| | | | 705/325 |
| 2016/0188201 A1* | 6/2016 | Hosier, Jr. | G06Q 50/01 |
| | | | 715/753 |
| 2017/0099455 A1* | 4/2017 | Mazzarella | H04W 4/90 |
| 2018/0248996 A1 | 8/2018 | Johnson et al. | |
| 2018/0357073 A1 | 12/2018 | Johnson et al. | |
| 2019/0012341 A1 | 1/2019 | Proctor et al. | |
| 2019/0121497 A1* | 4/2019 | Tov | H04L 41/22 |
| 2019/0149959 A1* | 5/2019 | Kee | H04W 4/08 |

\* cited by examiner

MULTIPLE TALKGROUP NAVIGATION MANAGEMENT

BACKGROUND OF THE INVENTION

Public safety personnel that provide services in emergency situations often use communication devices. For example, police officers, medical first responders, fire fighters, military personnel, and the like may use communication devices, for example, two-way radios or converged devices (for example, a combination of a smart telephone and a two-way radio). In some emergency situations, public safety personnel may need to quickly access and use functionality provided by one or more software applications.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted above, public safety personnel use electronic communication devices to communicate with each other. The personnel may be assigned to one or more talkgroups. A talkgroup is a defined group of communication devices that share communications with each other via one or more communication modalities. As explained below, each talkgroup may utilize particular types of applications, for example, based on a role of participants of the talkgroup. In one example, one talkgroup is established for a group for firefighting personnel, while another talkgroup is used by medical response personnel.

When a user is assigned to multiple talkgroups, the user may be associated with a different roles in each talkgroup. As a user switches communications between each talkgroup, it may become complicated for the user to navigate to necessary applications for the different talkgroups. Accordingly, systems and methods described herein provide, among other things, a graphical user interface for improved transition between talkgroup communications.

One example embodiment provides a communication device including a user input interface, a display, and an electronic processor communicatively coupled to the display. The electronic processor is configured to generate, on the display, a graphical user interface, generate, on the display, a first screen including a first plurality of applications related to a first talkgroup that the communication device is associated with, the first plurality of applications including applications related to an incident associated with the first talkgroup, receive, via the user input interface, a user input indicative of a request to change talkgroups, and generate on the display, in response to the user input, a second screen including a second plurality of applications related to a second talkgroup that the communication device is associated with, the second plurality of applications including applications related to an incident associated with the second talkgroup.

Another example embodiment provides a communication device including a user input interface, a display, and an electronic processor communicatively coupled to the display. The electronic processor is configured to generate, on the display, a graphical user interface, associate the communication device with a first talkgroup, present, on the display, a first application related to the first talkgroup, receive, via the user input interface, a user input indicative of a request to change talkgroups, associate, in response to the user input, the communication device with a second talkgroup, and present, on the display, a second application related to the second talkgroup.

Another example embodiment provides a method of navigating between multiple talkgroups on a communication device. The method includes generating, on a display, a graphical user interface, generating, on the display, a first screen including a first plurality of applications related to a first talkgroup that the communication device is associated with, the first plurality of applications including applications related to an incident associated with the first talkgroup, receiving, via a user input interface, a user input indicative of a request to change talkgroups, and generating on the display, in response to the user input, a second screen including a second plurality of applications related to a second talkgroup that the communication device is associated with, the second plurality of applications including applications related to an incident associated with the second talkgroup.

Another example embodiment provides a method of navigating between multiple talkgroups on a communication device. The method includes generating, on a display, a graphical user interface, associating the communication device with a first talkgroup, presenting, on the display, a first application related to the first talkgroup, receiving, via a user input interface, a user input indicative of a request to change talkgroups, associating, in response to the user input, the communication device with a second talkgroup, and presenting, on the display, a second application related to the second talkgroup.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. For example, although the examples described herein are in terms of public safety personnel, in further embodiments, the methods described herein may be applied to different communication groups (for example, manufacturing personnel).

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

Figure 1:
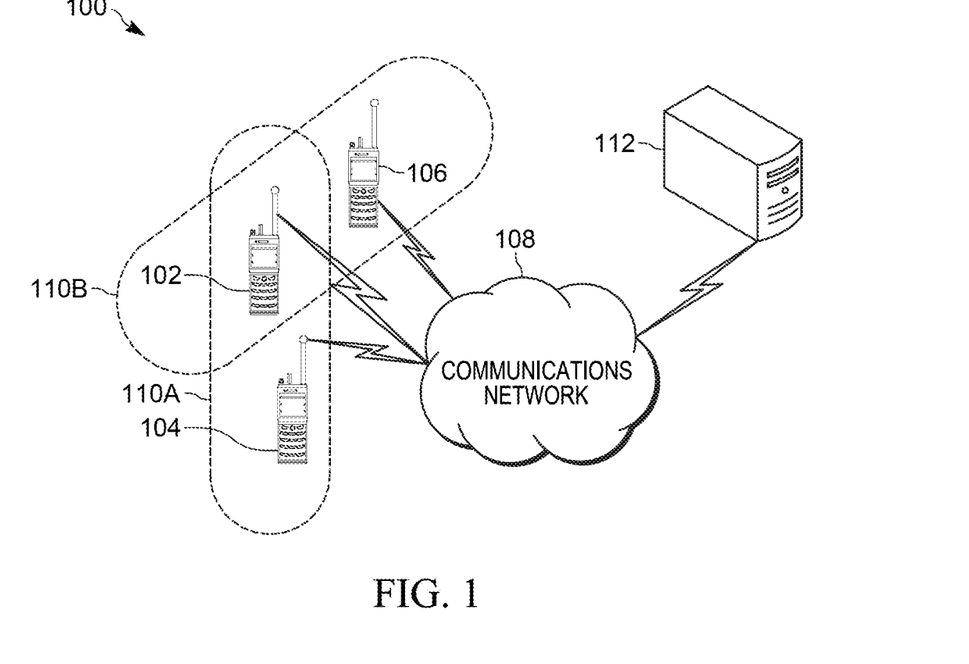
FIG. 1 is a block diagram of a communication system in accordance with some embodiments.

FIG. 1 is a diagram of a communication system 100 according to one example. In the example shown, the communication system 100 includes electronic communication devices 102, 104, and 106. In the following description, when explaining how a single electronic communication device functions, a reference to electronic communication device 102 is used. The electronic communication devices 104 and 106 may be configured similarly. It is not necessary, however, that the electronic communication devices 102, 104, and 106 be identical. The electronic communication devices of the communication system 100 are merely examples. In some embodiments, the communication system 100 may include more or fewer communication devices than illustrated in FIG. 1.

The electronic communication devices 102, 104, and 106 communicate with each other over a communication network 108. The network 108 may be a wireless communication network. All or parts of the network 108 may be implemented using various existing networks, for example, a cellular network, the Internet, a land mobile radio (LMR) network, a Bluetooth™ network, a wireless local area network (for example, Wi-Fi), a wireless accessory Personal Area Networks (PAN), a Machine-to-machine (M2M) autonomous network, and a public switched telephone network. The network 108 may also include future developed networks. In some embodiments, the network 108 may also include a combination of the networks mentioned.

Each of the electronic communication devices 102, 104, and 106 is associated with one or more talkgroups. In the illustrated embodiment, devices 102 and 104 are associated with a first talkgroup 110A and devices 102 and 106 are associated with a second talkgroup 110B. A talkgroup may be defined or assigned based on various criteria. For example, a talkgroup may be established for devices associated with a particular public safety organization or department, a particular incident, a particular member role or designation, or a combination thereof. For example, a talkgroup may relate to an organization of first responders, a group of police officers, a fire incident, or a combination thereof. Similarly, a talkgroup may relate to members having the same role or designation (for example, police officer, detective, supervisor, paramedic, firefighter, and the like). As another example, paramedics and firefighters might be grouped into two different talkgroups even though they are responding to the same public safety incident.

The talkgroups and communications therebetween may be managed by a communications controller 112. The communications controller 112 may be a server that is centrally maintained, for example, at a call center or public safety command center. The communications controller 112 may control communication between the devices 102, 104, and 106 over the network 108 in accordance with talkgroup affiliation. In some embodiments, the system 100 includes more than one communications controller. Alternatively, in some embodiments one or more of the communication devices of the system 100 may be configured to manage and monitor one or more talkgroups and communications thereof.

The electronic communication device 102 (described in more detail below in regard to FIG. 2) may be a handheld communication device, for example, a mobile telephone or other portable communication device, smart watch or other smart wearable, or other device configured to communicate over the network 108. In the illustrated embodiment, the communication device 102 is configured to communicate via one or more communication modalities, for example text messaging and push-to-talk (PTT) communications.

In some embodiments, the electronic communication device 102 may be distributed over more than one device. For example, the communication device 102 may be a portable touchscreen display device paired to a portable/handheld radio carried by a public safety officer or first responder, such as a police officer via a personal area network (for example, via a Bluetooth network, Zigbee network, and other network or connection). In some embodiments, the electronic communication device 102 is a mobile communication device mounted in or on a vehicle (for example, a police vehicle). In some embodiments, the electronic communication device 102 may be a device maintained, for example, at a call center or public safety command center.

Figure 2:
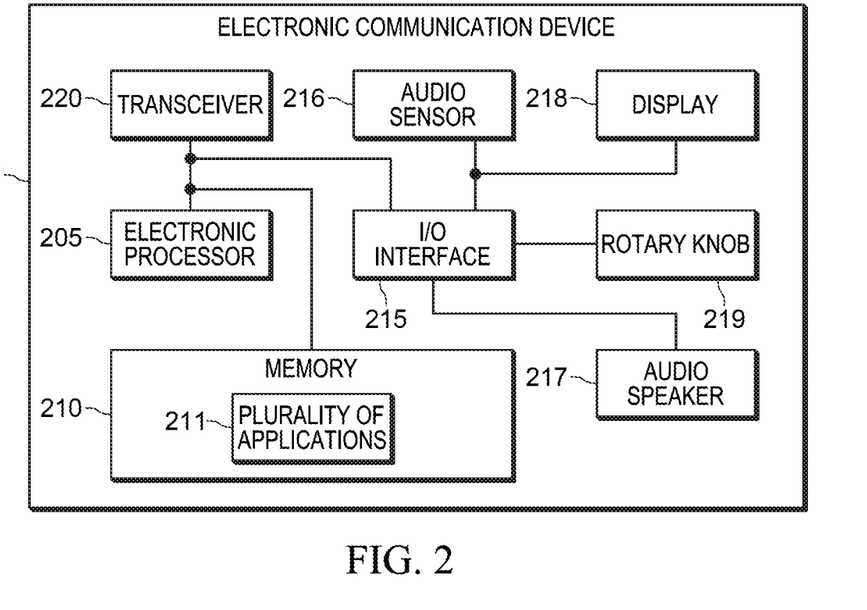
FIG. 2 is a block diagram of an electronic communication device included in the communication system of FIG. 1 in accordance with some embodiments.

FIG. 2 is a block diagram of a communication device 102. In the example shown, the communication device 102 includes an electronic processor 205, a memory 210, and an input/output interface 215. The illustrated components, along with other various modules and components are coupled to each other by or through one or more connections including, for example, control or data buses that enable communication therebetween. The use of control and data buses for the interconnection between and exchange of information among the various modules and components would be apparent to a person skilled in the art in view of the description provided herein.

The electronic processor 205 obtains and provides information (for example, from the memory 210 and/or the input/output interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein.

The memory 210 can include one or more non-transitory computer-readable media, and includes a program storage area and a data storage area. The program storage area and the data storage area can include combinations of different types of memory, as described herein. The memory 210 may take the form of any non-transitory computer-readable medium. In the embodiment illustrated, the memory 210 stores, among other things, one or more applications 211. Each of the applications are configured to perform a particular function and/or provide access to features of the device when executed by the electronic processor 205. Functions and features include, for example, texting, audio communications, retrieving and displaying information from a public and/or private database (for example, weather, dispatch control, etc.), video/camera capture, and the like. Such applications may include, for example, a messaging application that provides features to support the composition and sending of electronic messages that include alphabetic and numeric characters, for example, a cellular text messaging application, an instant messaging application, and the like. Another application may provide features to support the reception and transmission of PTT calls. Such calls may be one-to-one calls or group calls and may be transmitted over cellular networks, data networks, radio networks and the like (for example, those described above in regard to the transceiver 220).

The input/output interface 215 is configured to receive input, via one or more user input devices or interfaces, and to provide system output via one or more user output devices. The input/output interface 215 obtains information and signals from, and provides information and signals to (for example, over one or more wired and/or wireless connections) devices both internal and external to the communication device 102. In the illustrated embodiment, the input/output interface 215 includes an audio sensor 216, an audio speaker 217, and a display 218. The display 218 may be, for example, a liquid crystal display (LCD) touch screen, or an organic light-emitting diode (OLED) touch screen. Output may also be provided via an audio speaker 217. The audio speaker 217 is a transducer that produces sound from electrical signals (for example, generated from an audio stream) received from the electronic processor 205. Alternative embodiments may include additional output mechanisms, for example, haptic feedback motors and light sources (not shown). Input may be provided via the audio sensor 216. The audio sensor 216 is configured to capture audio. The audio sensor 216 may be, for example, a microphone.

In the illustrated embodiment, input is also provided by a rotary knob 219. The rotary knob 219 is a mechanical knob interface. In particular, the rotary knob 219 is rotatable through a plurality of positions, wherein each of the plurality of positions is associated with a particular transmission channel. Accordingly, user input received through the rotary knob 219 includes selection of one of the plurality of positions (e.g., through clockwise rotation or counter-clockwise rotation of the rotary knob 219). In some embodiments, the rotary knob 219 provides input for a primary function independent of a software application of the device 102. For example, when the display 218 is displaying an application screen generated by the processor 205 and the rotary knob 219 receives user input (i.e., is rotated), the operation of the rotary knob 219 does not modify the operation or output of the application. The rotary knob 219 may be, for example, (when the device 102 is a converged radio device) a channel selection knob provided for selecting a transmission channel (e.g., for radio transmissions) or a volume knob for adjusting an output volume of the audio speaker 217. As explained in more detail below, the rotary knob 219 may be utilized by a user of the device 102 to navigate between talkgroups and pluralities of applications associated with each talkgroup. In some embodiments, the rotary knob 219 is a virtual knob, for example, presented via a graphical user interface or using touch-sensitive surfaces.

Input may also be provided, for example, via a keypad, soft keys, icons, or soft buttons on the display, a scroll ball, buttons, and the like. The input/output interface 215 includes a graphical user interface (GUI) (for example, generated by the electronic processor 205, from instructions and data stored in the memory 210, and presented on the display 218) that enables a user to interact with the communication device 102 (for example, to execute one or more of the applications 211).

The transceiver 220 is configured for wireless coupling to wireless networks (for example, land mobile radio (LMR) networks, Long Term Evolution (LTE) networks, Global System for Mobile Communications (or Groupe Special Mobile (GSM)) networks, Code Division Multiple Access (CDMA) networks, Evolution-Data Optimized (EV-DO) networks, Enhanced Data Rates for GSM Evolution (EDGE) networks, 3G networks, 4G networks, combinations or derivatives thereof, and other suitable networks, including future-developed networks. Alternatively, or in addition, the electronic communication device 102 may include a connector or port (not shown) for receiving a connection to a wired network (for example, Ethernet). The electronic processor 205 is configured to operate the transceiver 220 to receive input from and to provide system output, or a combination of both. The transceiver 220 obtains information and signals from, and provides information and signals to, (for example, over one or more wired and/or wireless connections) devices (including, in some embodiments, from the communication controller) both internal and external to the electronic communication device 102.

The electronic processor 205 obtains and provides information (for example, from the memory 210 and/or the transceiver 220), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein.

Figure 3A:
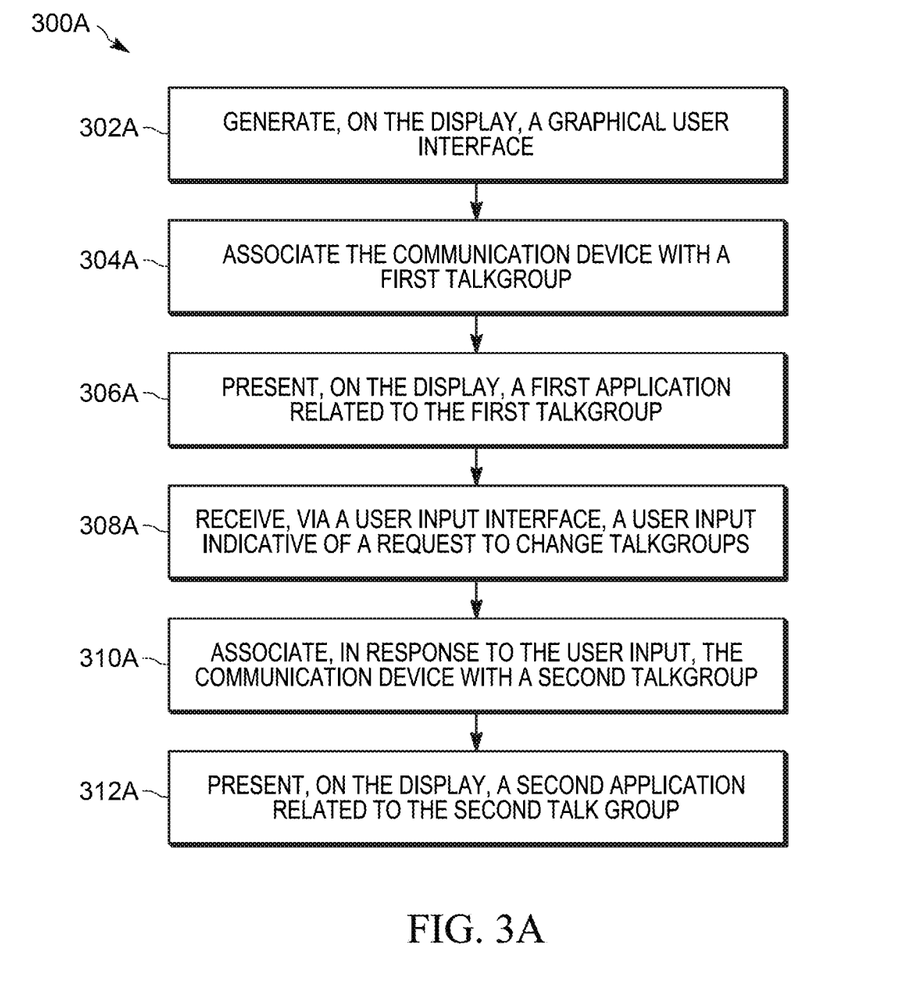
FIG. 3A is flowchart illustrating a method of navigating between talkgroups implemented by the electronic communication device of FIG. 2 in accordance with some embodiments.

FIG. 3A is a flowchart illustrating an example method 300A of navigating between multiple talkgroups on a communication device. As an example, the method 300A is described as being performed by the electronic communication device 102 and, in particular, the electronic processor 205. However, it should be understood that in some embodiments, portions of the method 300A may be performed by other devices, including, for example, the communications controller 112.

At block 302A, the electronic processor 205 generates, on the display 218, a graphical user interface and, at block 304A, associates (or assigns) the communication device 102 with a first talkgroup (for example, talkgroup 110A). At block 306A, the electronic processor 205 presents, on the display 218, a first application related to the first talkgroup. The first application may be, for example, a PTT communications application for communicating with the users of the devices of the first talkgroup via a PTT call. The first application may be a particular application common to each of the devices of the first talkgroup 110A.

At block 308A, the electronic processor 205 receives, via a user input interface (an input device or interface of the input/output interface 215), a user input indicative of a request to change talkgroups. As described below in regard to FIG. 4B, the user input may be, for example, a gesture on the display 218 (in embodiments where the display 218 is a touchscreen) or an actuation of a particular mechanical input of the device 102 (for example, a rotation of the rotary knob 219). In embodiments where the rotary knob 219 provides input for a primary function independent of software, the rotary knob 219 provides input for a secondary function (as described above, switching between talkgroups). In some embodiments, a user input via the rotary knob 219 is indicative of a request to change talkgroups when an additional input is received (for example, while a user of the device 102 is touching the display 218).

The electronic processor 205, in response to the user input, associates (or assigns) the communication device 102 with a second talkgroup (for example, the talkgroup 110B) at block 310A and presents, on the display 218, a second application related to the second talkgroup. The second application may be, for example, a messaging communications application for communicating with the users of the devices of the second talkgroup. In some embodiments, the second application is the same as the first application. In such embodiments, content of the applications may differ based on the talkgroup. For example, when both the first and second application are a group messaging application, a conversation thread of the first talkgroup is displayed within the first application while a conversation thread of the second talkgroup is displayed within the second application. As explained in more detail below, each talkgroup may be associated with an incident. In such embodiments, the first and second application may each be based on the incident associated with the first and second talkgroup respectively.

Although the method 300A above is described in terms of a single application being associated with each talkgroup, as mentioned previously, each talkgroup may utilize multiple applications when handling an incident. Accordingly, it may be particularly complicated for a user to navigate to the necessary application(s) when switching between talkgroups. In some embodiments, the method 300A is further configured to provide quick access to multiple applications associated with the multiple talkgroups in addition to simple transitioning between talkgroups.

Figure 3B:
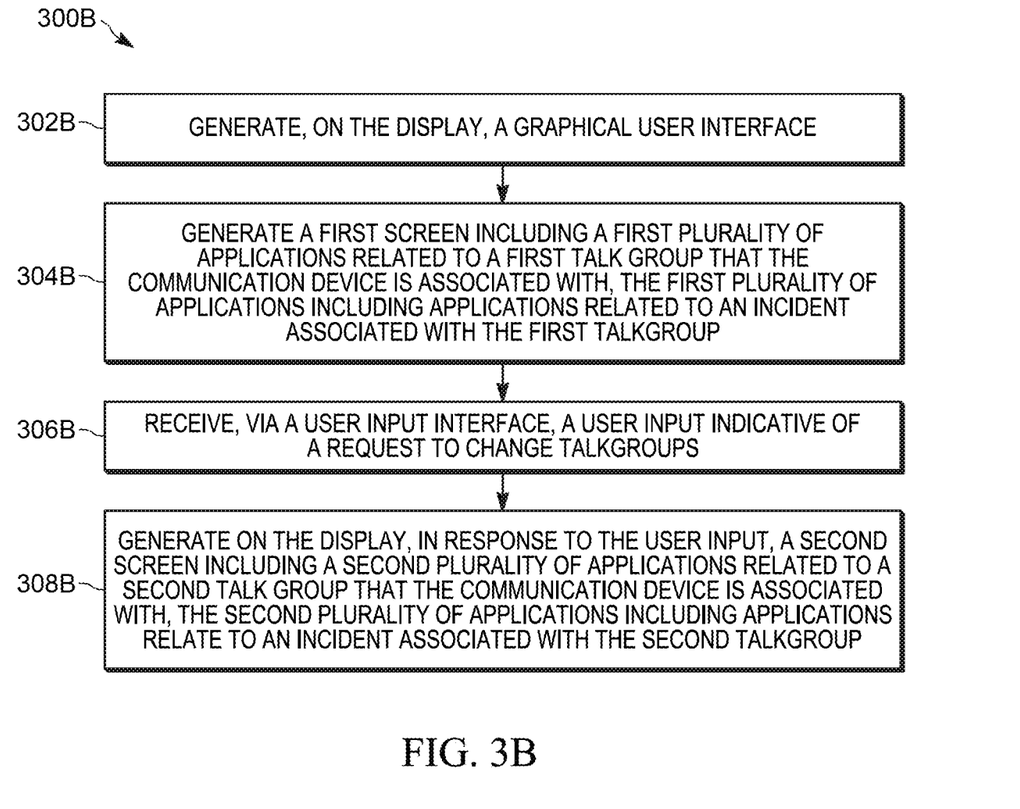
FIG. 3B is flowchart illustrating a method of navigating between talkgroups implemented by the electronic communication device of FIG. 2 in accordance with some embodiments.

FIG. 3B is a flowchart illustrating an example method 300B of operating a communication device associated with multiple talkgroups. As an example, the method 300B is described as being performed by the electronic communication device 102 and, in particular, the electronic processor 205. However, it should be understood that in some embodiments, portions of the method 300B may be performed by other devices, including, for example, the communications controller 112. The method 300B may be considered a particular embodiment of the method 300A. As such, portions of the method 300B are similar to those of the method 300A described above.

At block 302B, the electronic processor 205 generates, on the display 218, a graphical user interface. At block 304B, the electronic processor 205 generates, on the display 218, a first screen including a first plurality of applications related to a first talkgroup that the communication device 102 is associated with (for example, the talkgroup 110A). The first plurality of applications include applications related to an incident associated with the first talkgroup 110A.

Figure 4A:
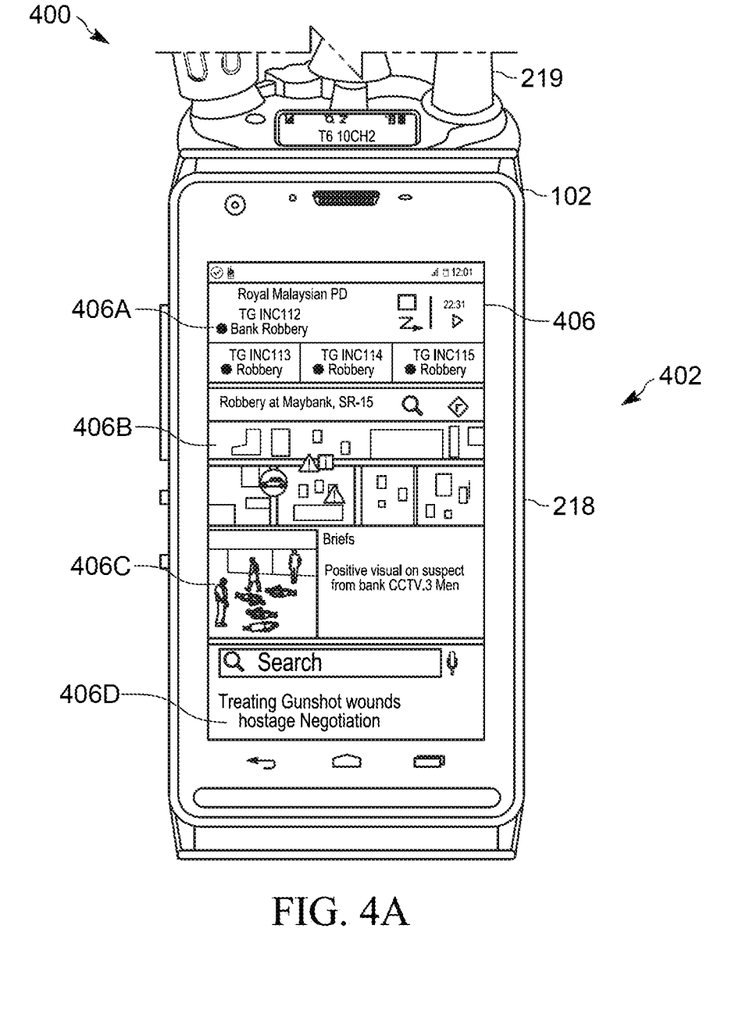
FIG. 4A is a graphical display of the communication device of FIG. 2 performing the method of FIG. 3 in accordance to some embodiments.

FIG. 4A illustrates the electronic communication device 102. A first screen 402 is shown on the display 218. The first screen 402 includes a plurality of applications 404 related to the talkgroup 110A. As mentioned above, the plurality of applications 404 include applications related to an incident associated with the first talkgroup 110A. For example, in the illustrated embodiment, the talkgroup 110A is associated with an ongoing robbery incident. The plurality of applications may include, for example, a summary of the first talkgroup 110A (a role type of the talkgroup or participants of the talkgroup, a list of the participants of the talkgroup, and the like), a summary of recently accessed talkgroups of the device 102, and information regarding the incident associated with the first talkgroup 110A. In the illustrated embodiment, the first screen 402 includes applications related to the robbery (an incident identifier 406A, a map of the robbery location 406B, and captured media or video of the robbery 406C). In some embodiments, the first plurality of applications may include a search bar (for example, search bar 406D). The search bar is configured to search local databases and resources (for example, applications and files stored on the device 102), external databases and resources (for example, webpages and files online) for information based on one or more entered terms. As shown in the illustrated embodiment, the search bar 406D may include one or more suggested search terms. The search terms may be related to the incident associated with the first talkgroup 110A. The suggested search terms may be generated automatically based on the incident, one or more terms detected within the plurality of applications 404, or both. The suggested search terms may be generated based on previously searched terms performed.

Figure 4B:
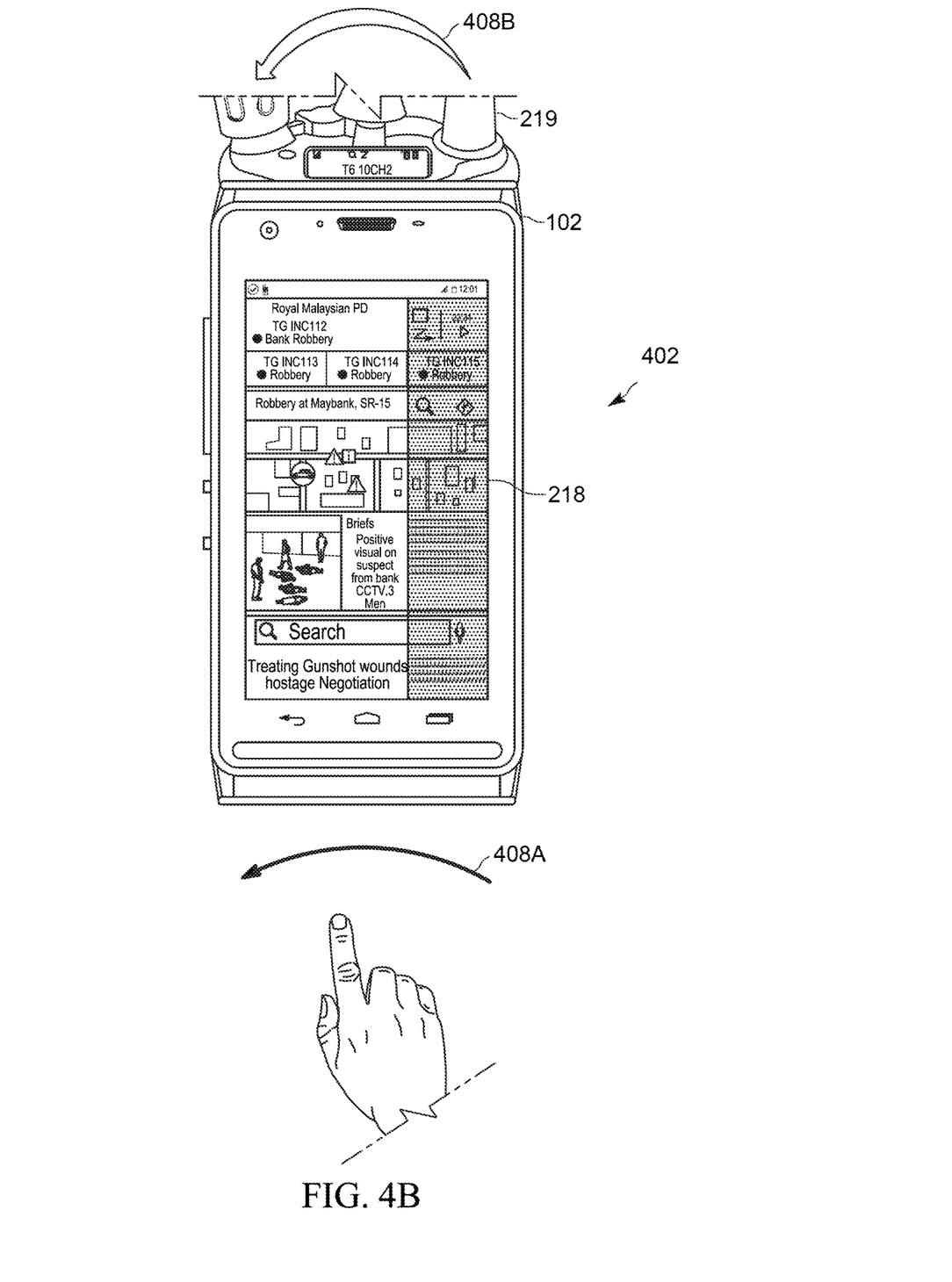
FIG. 4B is a graphical display of the communication device of FIG. 2 performing the method of FIG. 3 in accordance with some embodiments.

Returning to FIG. 3B, at block 306B, the electronic processor 205 receives, via a user input interface (an input device or interface of the input/output interface 215), a user input indicative of a request to change talkgroups. As illustrated in FIG. 4B, the user input may be a gesture (for example, a swipe 408A) on the display 218. Alternatively or additionally, the user input may be an actuation (a rotation 408B) of the rotary knob 219.

Returning to FIG. 3B, at block 308B, the electronic processor 205 generates on the display 218, in response to the user input, a second screen including a second plurality of applications related to a second talkgroup that the communication device 102 is associated with (for example, the second talkgroup 110B). The second plurality of applications include applications related to an incident associated with the second talkgroup 110B.

Figure 4C:
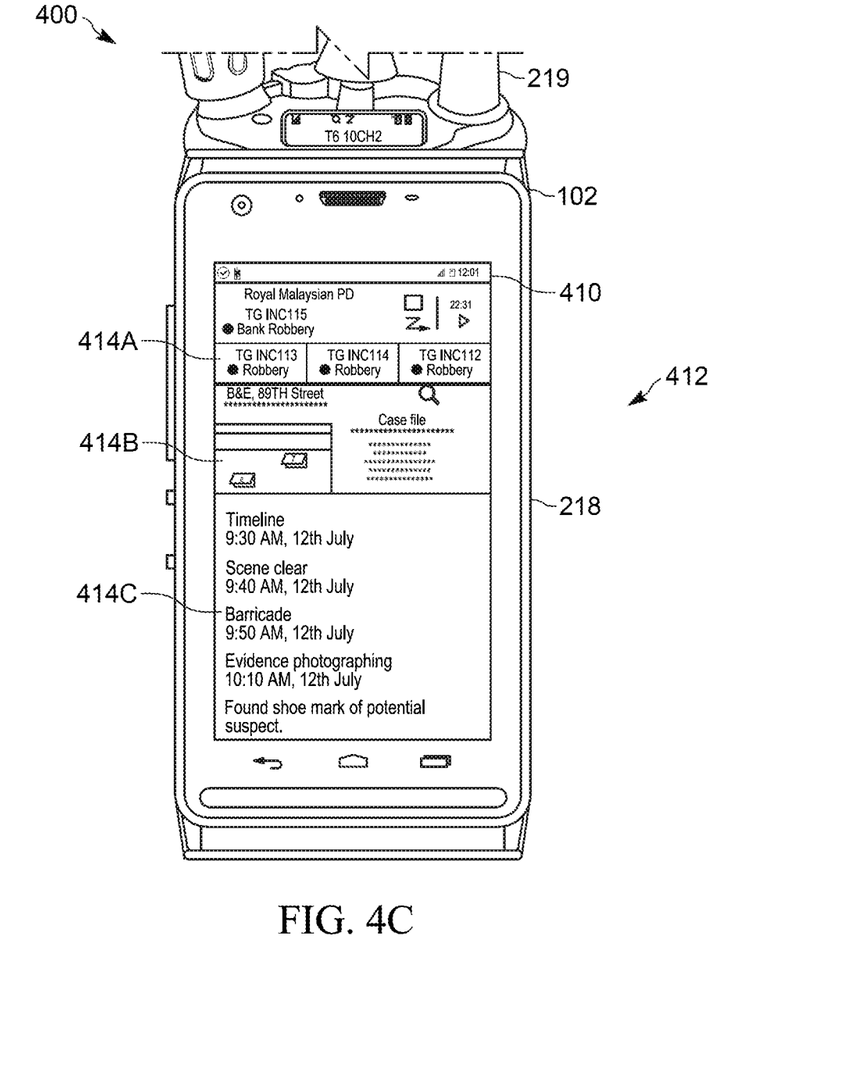
FIG. 4C is a graphical display of the communication device of FIG. 2 performing the method of FIG. 3 in accordance to some embodiments.

FIG. 4C illustrates the electronic communication device 102. A second screen 410 is shown on the display 218. The second screen 410 includes a plurality of applications 412 related to the talkgroup 110B. As mentioned above, the plurality of applications 412 include applications related to an incident associated with the second talkgroup 110B. For example, in the illustrated embodiment, the talkgroup 110B is associated with a robbery investigation. Accordingly, the second screen 410 includes applications related to the robbery investigation (an incident identifier 414A, a case summary 414B, and a timeline of the robbery 414C). The second plurality of applications 412 may include one or more applications similar to those described above in regard to the first plurality of applications 404.

In some embodiments, the first plurality of applications 404 may include one or more applications that are included in the second plurality of applications 412. In some embodiments, the first talkgroup 110A and the second talkgroup 110B may be associated with the same incident. In such embodiments, the first talkgroup 110A may be associated with a first role while the second talkgroup 110B is associated with a second role different from the first. For example, when the incident is a fire incident, the first role of the first talkgroup 110A may be a firefighter role while the second role of the second talkgroup 110B is a medical responder role.

In some embodiments, the arrangement (the positions of each of the applications on the display 218) of the first plurality of applications 404, the arrangement of the second plurality of applications 412, or both is based on a priority associated with each of the applications. For example, applications of higher priority are positioned at the top of the screen of the display 218. In some embodiments, the priority is automatically set by the electronic processor 205. For example, an application may be set to a high priority when a change or new information has become available in the application (for example, when a new message is received or when new media has been uploaded).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A communication device assigned to a first talkgroup of a trunked radio system and a second talkgroup of the trunked radio system, the communication device including:
   a user input interface;
   a display;
   an electronic processor communicatively coupled to the display and configured to:
   generate, on the display, a graphical user interface;
   generate, on the display, a first screen associated with the first talkgroup, the first screen including a first plurality of applications related to the first talkgroup that the communication device is assigned to, the first plurality of applications including applications related to an incident associated with the first talkgroup;
   receive, via the user input interface, a user input requesting to change talkgroups; and
   generate on the display, in response to the user input, a second screen including a second plurality of applications related to the second talkgroup that the communication device is assigned to, the second plurality of applications including applications related to an incident associated with the second talkgroup.

2. The communication device of claim 1, wherein an arrangement of the first plurality of applications and the second plurality of applications is based on a priority associated with the applications of the first plurality of applications and the second plurality of applications.

3. The communication device of claim 1, wherein the first talkgroup is associated with a first role and the second talkgroup is associated with a second role.

4. The communication device of claim 3, wherein the first talkgroup and the second talkgroup are associated with the same incident.

5. The communication device of claim 1, wherein the first plurality of applications or the second plurality of applications includes at least one selected from the group consisting of a summary of the first talkgroup or the second talkgroup, a summary of recently accessed talkgroups, information regarding the incident associated with the first talkgroup or the second talkgroup, and a search bar.

6. The communication device of claim 5, wherein the search bar includes search terms related to the incident associated with the first talkgroup or the second talkgroup.

7. A communication device assigned to a first talkgroup of a trunked radio system and a second talkgroup of the trunked radio system, the communication device including:
    a user input interface;
    a display;
    an electronic processor communicatively coupled to the display and configured to:
    generate, on the display, a graphical user interface;
    present, on the display, a first application of the first talkgroup, the first application being related to an incident associated with the first talkgroup;
    receive, via the user input interface, a user input requesting to change talkgroups; and
    present, on the display, a second application of the second talkgroup, the second application being related to an incident associated with the second talkgroup.

8. The communication device of claim 7, wherein the user input interface is a touchscreen and the user input is a particular gesture on the touchscreen.

9. The communication device of claim 7, wherein the user input interface is a rotary knob and the user input is a particular rotation of the rotary knob.

10. The communication device of claim 7, wherein the first application is related to a first incident and the second application is related to a second incident.

11. A method of navigating between multiple talkgroups on a communication device assigned to a first talkgroup of a trunked radio communication and a second talkgroup of the trunked radio communication, the method comprising:
    generating, on a display, a graphical user interface;
    generating, on the display, a first screen associated with the first talkgroup, the first screen including a first plurality of applications related to the first talkgroup that the communication device is assigned to, the first plurality of applications including applications related to an incident associated with the first talkgroup;
    receiving, via a user input interface, a user input requesting to change talkgroups; and
    generating on the display, in response to the user input, a second screen including a second plurality of applications related to a second talkgroup that the communication device is assigned to, the second plurality of applications including applications related to an incident associated with the second talkgroup.

12. The method of claim 11, wherein an arrangement of the first plurality of applications and the second plurality of applications is based on a priority associated with the applications of the first plurality of applications and the second plurality of applications.

13. The method of claim 11, wherein the first talkgroup is associated with a first role and the second talkgroup is associated with a second role.

14. The method of claim 13, wherein the first talkgroup and the second talkgroup are associated with the same incident.

15. The method of claim 11, wherein the first plurality of applications or the second plurality of applications includes at least one selected from the group consisting of a summary of the first talkgroup or the second talkgroup, a summary of recently accessed talkgroups, information regarding the incident associated with the first talkgroup or the second talkgroup, and a search bar.

16. The method of claim 15, wherein the search bar includes search terms related to the incident associated with the first talkgroup or the second talkgroup.

17. A method of navigating between multiple talkgroups on a communication device assigned to a first talkgroup of a trunked radio system and a second talkgroup of the trunked radio system, the method comprising:
    generating, on a display, a graphical user interface;
    presenting, on the display, a first application of the first talkgroup, the first application being related to an incident associated with the first talkgroup;
    receiving, via a user input interface, a user input requesting to change talkgroups; and
    presenting, on the display, a second application of the second talkgroup, the second application being related to an incident associated with the second talkgroup.

18. The method of claim 17, wherein the user input interface is a touchscreen and the user input is a particular gesture on the touchscreen.

19. The method of claim 17, wherein the user input interface is a rotary knob and the user input is a particular rotation of the rotary knob.

20. The method of claim 17, wherein the first application is related to a first incident and the second application is related to a second incident.

* * * * *